United States Patent [19]
Smith

[11] Patent Number: 5,299,825
[45] Date of Patent: Apr. 5, 1994

[54] COLLAPSIBLE STROLLER

[76] Inventor: Clark D. Smith, 7154 Pershing, St. Louis, Mo. 63130

[21] Appl. No.: 939,114

[22] Filed: Sep. 2, 1992

[51] Int. Cl.5 .............................................. B62B 7/06
[52] U.S. Cl. .................................. 280/644; 280/642; 280/650
[58] Field of Search ................ 280/1.5, 642, 644, 647, 280/47.38, 47.2, 650, 658, 62, 649; 297/46, 325, 326, 354

[56] References Cited

U.S. PATENT DOCUMENTS

| | | | |
|---|---|---|---|
| 699,186 | 5/1902 | Katzke . | |
| 2,744,605 | 12/1956 | Schladebach | 280/38 |
| 3,539,196 | 11/1970 | Fleming | 280/92 |
| 4,369,986 | 1/1983 | de la Fe | 280/644 |
| 4,934,728 | 6/1990 | Chen | 280/644 |
| 5,029,891 | 7/1991 | Jacobs | 280/650 |

OTHER PUBLICATIONS

Author: T.R.I. Industries, Inc., Hopkins, MN; Advertisement for "3-Wheel Wonder TM " at p. 110; Runner's World; Oct. 1990.
The Baby Jogger ® advertisement at p. 109; Runner's World Oct. 1990.
Walking/jogging karts advertisement at p. 112; Runner's World Oct. 1990.
Walkabout Baby Walker; date unknown.
Run about for Family Fun brochure by Uni-USA, Inc. of Aloha, OR; 1989.

Primary Examiner—Richard M. Camby
Attorney, Agent, or Firm—Senninger, Powers, Leavitt & Roedel

[57] ABSTRACT

A collapsible stroller including a central frame having a front portion and a rear portion, and rear wheels mounted for rotation on the central frame. Forward and rearward frame members are hingedly connected to the central frame in which at least one front wheel is mounted for rotation on the forward frame member. The stroller is selectively configurable between the use position in which the forward frame member extends forwardly of the central frame and the rearward frame member extends rearwardly of the central frame and the stowed position in which the forward frame member and rearward frame member are superposed with the central frame.

16 Claims, 3 Drawing Sheets

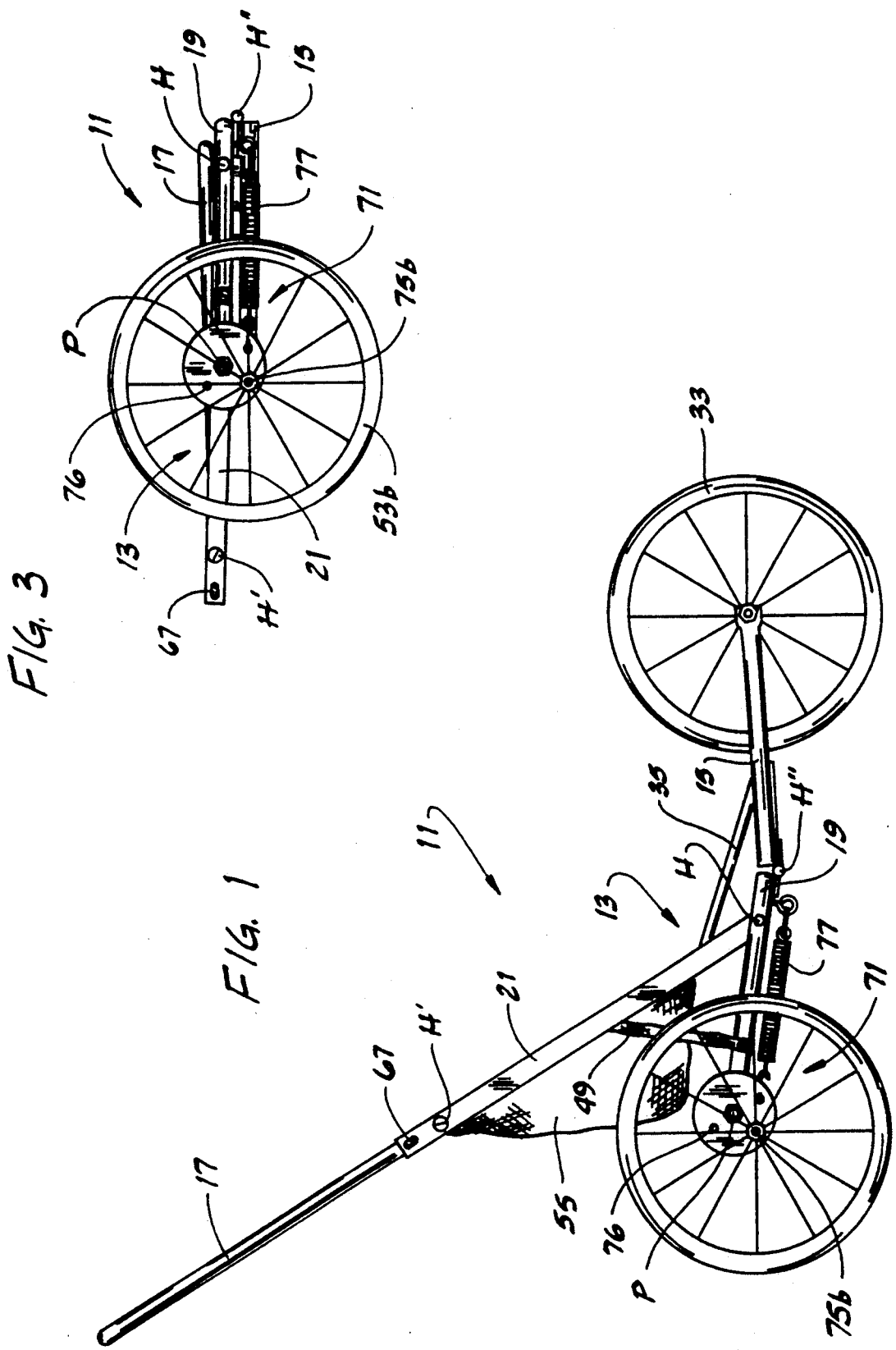

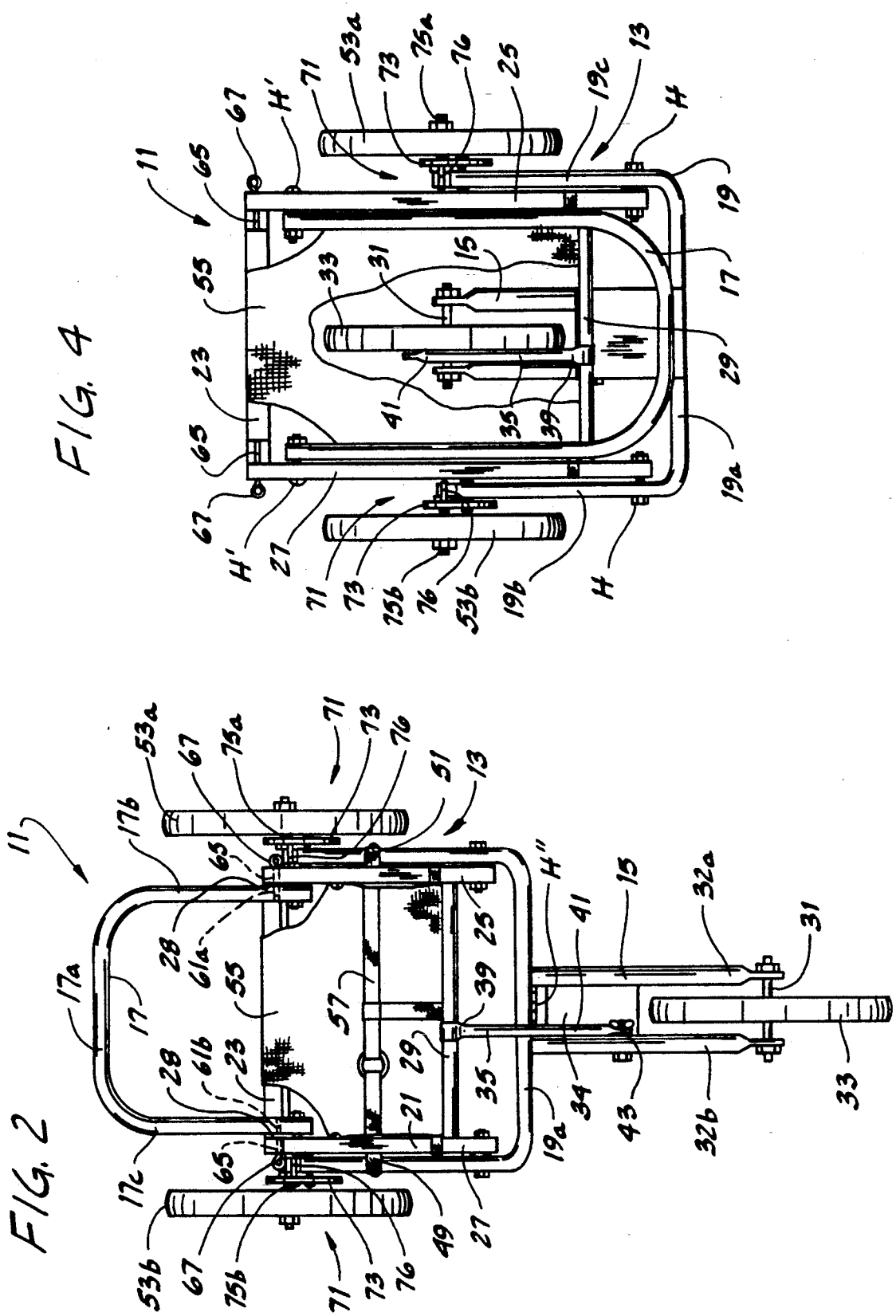

COLLAPSIBLE STROLLER

BRIEF SUMMARY OF THE INVENTION

This invention relates generally to strollers and more particularly to a stroller collapsible into a compact configuration.

Jogging strollers are presently popular items in today's fitness conscious society because a person may simultaneously entertain their child while exercising. However, the jogging strollers presently available are incapable of collapsing to a small enough configuration so that a person may conveniently transport the stroller in the trunk of an automobile or store the stroller in a small place, such as a closet. There is presently a need for a jogging stroller which may easily be moved between an operational configuration in which the stroller is ready for use, and a collapsed configuration in which the stroller is substantially reduced in size so that it may be transported or stored.

Accordingly, among the several objects of this invention may be noted the provision of an improved collapsible stroller which is easily collapsed for its transport or storage; and the provision of such a stroller which is durable, simple in construction and easy to use.

Generally, a collapsible stroller of this invention comprises a central frame having a front portion and a rear portion, and rear wheels mounted for rotation on the central frame. A forward frame member is hingedly connected to the central frame for swinging movement between a use position in which the forward frame member extends forwardly of said front portion of the central frame and a stowed position in which the forward frame member is superposed with and is substantially flat on the central frame. A front wheel is mounted for rotation on the forward frame member. A rearward frame member is hingedly connected to the central frame for swinging movement between a use position in which the rearward frame member extends upwardly and rearwardly from said rear portion of the central frame and a stowed position in which the rearward frame member is superposed with and is substantially flat on the central frame. The stroller is selectively configurable between the use position in which the forward frame member extends forwardly of the central frame and the rearward frame member extends upwardly and rearwardly from the central frame and the stowed position in which the forward frame member and rearward frame member are superposed with the central frame.

Other objects and features will be in part apparent and in part pointed out hereinafter.

BRIEF DESCRIPTION OF THE DRAWINGS

FIG. 1 is a side elevation of a collapsible stroller in its use position;

FIG. 2 is a plan view of the stroller shown in FIG. 1;

FIG. 3 is a side elevation of the stroller in its stowed position;

FIG. 4 is a plan view of the stroller shown in FIG. 3; and

Corresponding parts are designated by corresponding reference numerals in the several views of the drawings.

DESCRIPTION OF THE PREFERRED EMBODIMENT

Figure 5:
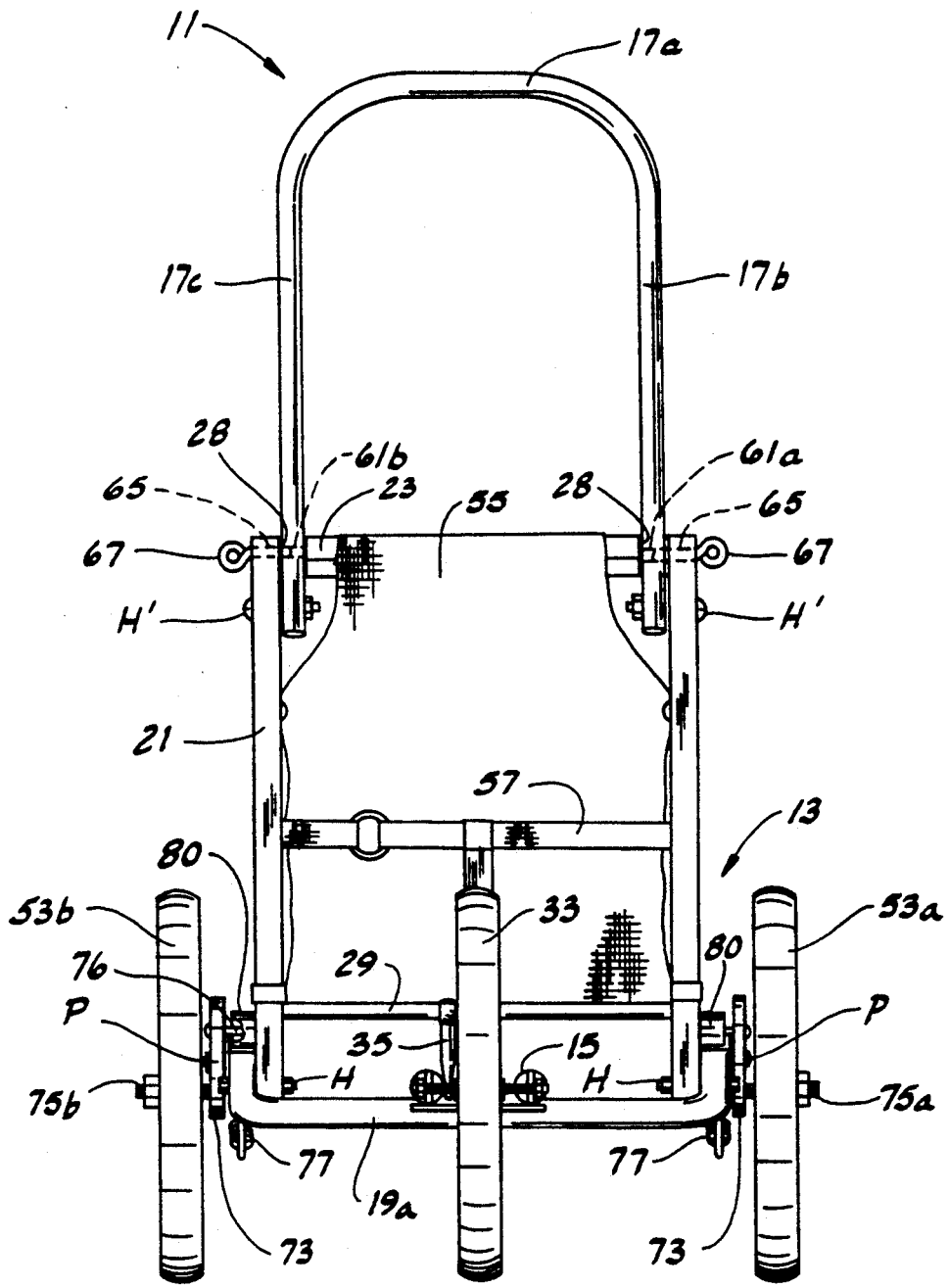
FIG. 5 is a front elevation of the stroller shown in FIG. 1 having parts broken away to show details.

Referring now to the drawings, there is generally indicated at 11 a collapsible stroller of the present invention which is capable of moving between an operational configuration and a collapsed or stowed configuration to be described hereinafter. The main components of the stroller include a central frame, generally indicated at 13, a forward frame member or yoke 15 and a rearward frame member or handle bar 17. As shown, the central frame has a front portion 19, and a rear portion 21 which is pivotally mounted by hinges H on the front portion. The rear portion 21 of the central frame 13 is generally rectangular-shaped and has four rails 23, 25, 27 and 29; the transverse rails being designated 23 and 29 and side rails being designated 25 and 27. Rails 25 and 27 are connected at their ends to respective ends of rail 23, and rail 29 is attached at its ends to rails 25 and 27 at a location generally opposite rail 23. As shown in FIG. 4, the front portion 19 of the central frame 13 is a generally U-shaped piece (the forward end of the front portion being designated 19a, and the laterally opposite sides of the front portion being designated 19b and 19c). More specifically, the front portion 19 is attached to the rear portion 21 such that rail 29 is parallel and generally adjacent to forward end 19a of the front portion, and the laterally opposite sides 19b, 19c extend toward rail 23 on the outside of rails 25, 27, respectively. The rails 23, 25 and 27 of the rear portion 21 of the central frame, and forward end 19a of the front portion 19 define peripheral edges within which the yoke 15 and handle bar 17 are disposed when the stroller is collapsed (FIG. 3).

The handle bar 17 is formed as one piece and is U-shaped (the bottom of the U designated 17a, and the laterally opposite sides of the U designated 17b and 17c). Free ends 17b, 17c of the handle bar are hingedly attached by appropriate hinges H' to the ends of rails 25, 27 near but forward of rail 23. Handle bar 17, as with the other components of stroller 11, may be manufactured from tubular material, such as steel or aluminum tubing. As best shown in FIGS. 1 and 3, the handle bar 17 is capable of moving between a use position in which the handle bar is received in recesses 28 in the transverse rail 23 and extends rearwardly of the rear portion 21 of the central frame 13 and a stowed position in which the handle bar is superposed with and is substantially flat on the rear portion. The handle bar 17 swings rearwardly and upwardly over the central frame 13 when it moves from its stowed position to its use position. The handle bar 17 engages the transverse rail 23 in the recesses 28 and is held from further rearward swinging motion. The recesses 28 also allow the handle bar 17 to be coplanar with the rear portion 21 in the use position. In its stowed position, the handle bar 17 is disposed substantially within the peripheral edges of the central frame 13 as it is folded over generally flat onto the rear portion 21 of the central frame. The handle bar 17 has openings 61a, 61b located at each of its free ends 17b, 17c which are in registry with spring biased locking pins 65 mounted on and projecting through the side rails 25, 27 when the handle bar is in its use position. The locking pins 65 are biased to project into respective openings 61a, 61b in the handle bar to lock it in its use position. The pins 65 may be withdrawn from the openings 61a, 61b by pulling outwardly on their annular heads 67 for releasing the handle bar 17 to swing to its stowed position.

The yoke 15 is pivotally connected by a hinge H" to the front end 19a of the front portion 19 of the central frame and has an axle 31 mounting a front wheel 33 on the yoke. As shown in FIG. 2, the yoke 15 comprises two spaced-apart tubular members 32a, 32b which are connected and held rigid by a plate 34. It is to be understood that the yoke 15 may be constructed in other fashion (e.g. without plate 34) and still fall within the scope of the present invention. The axle 31 extends between members 32a, 32b at their ends opposite of where the yoke is connected to the central frame 13. The yoke 15 also may be swung on hinge H" about a transverse axis between a use position, in which the yoke extends forwardly of the front portion 19, and a stowed position in which the yoke is superposed with and is substantially flat on the central frame 13. The rearward ends of the tubular members 32a, 32b are disposed to engage the front end 19a of the front portion to stop pivoting of the yoke, and hold the yoke in the use position. The yoke 15 is adapted to swing rearwardly and downwardly from its use position to its stowed position under the central frame 13. In its stowed position, the yoke 15 is disposed substantially within the peripheral edges of the central frame 13. The front wheel 33 projects above and below the plane of the central frame 13 when the yoke is in its stowed position as shown in FIG. 3.

A strut 35, attached to rail 29 of the rear portion 21, is provided for holding the yoke 15 and rear portion 21 in fixed relation relative to one another in the use position of the yoke about the front portion 19. More particularly, the strut 35 releasably connects the rear portion 21 of the central frame 13 to the yoke 15 in the use position thereby holding the rear portion and yoke in a generally fixed relation relative to one another. The strut 35 is mounted at one end 39 on the transverse rail 29 of the rear portion 21 for swinging about the longitudinal axis of the rail. In the use position, the strut 35 extends forwardly of the rail 29 and is releasably attached at its end 41 by a suitable connector 43 (e.g., a slide bolt or latch) to the yoke 15. The strut 35 and the engagement of the rear ends of the tubular members 32a, 32b with the front end 19a of the front portion 19 holds the rear portion 21 and yoke 15 in fixed relation to maintain the stroller 11 in an erect configuration. To stow the strut 35, the end 41 is released and it is swung on transverse rail 29 to a position between the side rails 25, 27. Once the strut 35 is released, the rear portion 21 may swing from the use position in which it lies generally in a plane oblique to the plane of the front portion 19 (see FIG. 1) to a stowed position in which the rear portion is generally co-planar with the front portion (see FIG. 3). A pair of flexible straps 49, 51, extend between the front portion 19 and rear portion 21 of the central frame. The straps 49, 51 restrict the forward pivoting of the rear portion 21 relative to the front portion 19.

Rear wheels 53a, 53b are mounted on the front portion 19 at the laterally opposite ends 19b, 19c of the U-shaped front portion. A suspension system, generally indicated at 71, is provided for supporting the stroller frame relative to the rear wheels 53a, 53b. The suspension system 71 provides a smooth ride for the stroller 11 as the rear wheels travel over a bumpy roadway or sidewalk. Each rear wheel 53a, 53b comprises an independent suspension system 71, connecting each rear wheel to the central frame 13. Each suspension system 71 comprises a disc 73 attached to the front portion 19 of the central frame for rotation relative to the front portion. The disc 73 is attached adjacent to the free end of the front portion 19 by a nut and bolt arrangement centrally through the disc about a pivot Point P. The rear wheel (53a or 53b) is eccentrically mounted on the disc 73 by an axle (75a or 75b) located below and slightly rearwardly of the pivot point P, as best seen in FIGS. 1 and 3. A stop 76 is engageable with the front portion 19 and restricts rotation of the disc 73 about pivot point P in the counterclockwise direction. The disc 73 is biased by a spring 77 (or an elastomeric cord, not shown) to resist but allow clockwise rotation of the disc 73 and generally vertical movement of the wheel relative to the front portion 19 as the wheel rotates on its axle. Thus, upon engaging a bump in the road or sidewalk, the wheel (53a or 53b) moves in a generally vertical or clockwise direction relative the disc pivot point P, and returns to its normal position, with the stop 76 engaging the central frame member 13, after absorbing the shock of the bump. As shown in FIG. 5, generally semi-cylindrical guards 80 are mounted on respective rearward ends of the laterally opposite sides 19b, 19c of the front portion of the central frame member Each guard 80 has an open end generally adjacent to a corresponding rear wheel (53a or 53b), and a closed end spaced further from the wheel. The stops 76 are received through the open ends of the guards 80 so that they are covered by the side walls and closed ends of the guards to protect against injury (e.g., as by pinching) as the stops pivot about point P away from and back against the central frame member 13. The guards 80 have been removed from FIGS. 2 and 4 so that the stops 76 may be seen. A portion of the left guard has been broken away in FIG. 5 to show reception of the stop 76 into the guard.

Stroller 11 further includes a seat 55, made from flexible material such as canvas or the like, which is removably mounted on the stroller. Seat 55 has a seat belt 57 which securely retains the infant in the seat when using the stroller. In its use position, the stroller may be used as a conventional stroller in which a person operating the stroller merely pushes it, or it may be used as a jogging stroller in which a person operating the stroller pushes the stroller while jogging or running.

The collapsible stroller 11 is selectively configurable between a use position in which the stroller may support an infant for walking or jogging, and a stowed position in which the stroller is in a reduced in size for storage or transportation. When in its use position, the handle bar 17 extends from the central frame 13 rearwardly, and the yoke 15 extends from the central frame forwardly. Locking pins 65 releasably lock the handle bar 17 in the use position. A strut 35 which is connected to the central frame 13 releasably connects the rear portion 21 of the central frame to the yoke 15 to hold the rear portion and the yoke in a generally fixed relation relative to one another. To stow the stroller 11, the locking pins 65 are pulled outward and the handle bar 17 swung forwardly and downwardly over the central frame 13 so that it is stowed generally within the periphery of the central frame. The strut 35 is released from the yoke 15 and the yoke is swung rearwardly and downwardly to its stowed position in which it is also generally within the periphery of the central frame. After releasing the forward end 41 of the strut 35 from the yoke 15 the front portion 19 may be collapsed so that it is in a co-planar relation with the rear portion 21. The flexible seat 55 is displaced by the front wheel 33 in its stowed position so that the front wheel lies generally between a first plane parallel to the plane of the central frame 13 and tangentially intersecting the rear wheels 53a, 53b on one side of the central frame and a second plane parallel to the central frame and tangentially intersecting the rear wheels on the opposite side of the central frame. As one alternative, the seat 55 may be removable to permit the front wheel 33 to move to its stowed position. In this compact configuration, the stroller 11 is readily stored (e.g., in the trunk of a vehicle) and transported.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A collapsible stroller comprising:
    a central frame having a front portion, and a rear portion;
    rear wheels mounted for rotation on the central frame; p1 a forward frame member hingedly connected to the central frame for swinging movement between a use position in which the forward frame member extends forwardly of said front portion of the central frame and a stowed position in which the forward frame member is superposed with and substantially flat on the central frame;
    a front wheel mounted for rotation on the forward frame member;
    a rearward frame member hingedly connected to the central frame for swinging movement between a use position in which the rearward frame member extends upwardly and rearwardly from said rear portion of the central frame and a stowed position in which the rearward frame member is superposed with and is substantially flat on the central frame;
    the stroller being selectively configurable between the use position in which the forward frame member extends forwardly of the central frame and the rearward frame member extends upwardly and rearwardly from the central frame and the stowed position in which the forward frame member and rearward frame member are superposed with the central frame;
    the central frame having peripheral edges, and the forward frame member and the rearward frame member being constructed and arranged relative to the central frame such that in the stowed position the forward frame member and the rearward frame member are disposed substantially within the peripheral edges of the central frame;
    the forward frame member being connected to the front portion of the central frame for swinging rearwardly and downwardly from its use position to its stowed position under the central frame and the rearward frame member is connected to the rear portion of the central frame for swinging forwardly and downwardly from its use position to its stowed position over the central frame, the front wheel projecting above and below the central frame when the forward frame member is in the stowed position;
    the rear portion of the central frame being pivotally mounted to the front portion of the central frame for swinging motion between the use position in which the rear portion extends generally upwardly from the front portion and lies generally in a plane oblique to a plane including the front portion, and the stowed position in which the rear portion is substantially coplanar with the front portion.

2. A collapsible stroller as set forth in claim 1 further comprising a strut adapted to releasably connect the rear portion of the central frame to the forward frame member in the use position thereby to hold the rear portion and forward frame member in a generally fixed relation relative to one another.

3. A collapsible stroller as set forth in claim 2 wherein the rearward frame member is hingedly attached to the rear portion of the central frame for swinging between the use position in which the rearward frame member extends generally rearwardly of the rear portion of the central frame and the stowed position in which the rearward frame member is folded over generally flat onto the rear portion of the central frame, and wherein the stroller further comprises means for releasably locking the rearward frame member in the use position.

4. A collapsible stroller as set forth in claim 3 further comprising independent suspension means connecting each rear wheel to the central frame, said suspension means comprising a mounting member pivotally attached to the front portion of the central frame, the mounting member being biased to resist but allow the generally vertical movement of the wheel as it rotates its point of attachment to the mounting member.

5. A collapsible stroller as set forth in claim 1 wherein the front wheel in the stowed position lies generally between a first plane parallel to the central frame and tangentially intersecting the rear wheels on one side of the central frame and a second plane parallel to the central frame and tangentially intersecting the rear wheels on the opposite side of the central frame.

6. A collapsible stroller as set forth in claim 1 further comprising a seat removably mounted on the stroller.

7. A collapsible stroller as set forth in claim 6 wherein the seat is made of flexible sheet material adapted to collapse with the stroller frame members into the stowed position.

8. A collapsible stroller comprising:
    a central frame having a front portion, and a rear portion;
    rear wheels mounted for rotation on the central frame;
    a forward frame member hingedly connected to the central frame for swinging movement between a use position in which the forward frame member extends forwardly of said front portion of the central frame and a stowed position in which the forward frame member is superposed with and is substantially flat on the central frame;
    at least one front wheel mounted for rotation on the forward frame member;
    a rearward frame member hingedly connected to the central frame for swinging movement between a use position in which the rearward frame member extends rearwardly of said rear portion of the central frame and a stowed position in which the rearward frame member is superposed with and is substantially flat on the central frame;

the stroller being selectively configurable between the use position in which the forward frame member extends forwardly of the central frame and the rearward frame member extends rearwardly of the central frame and the stowed position in which the forward frame member and rearward frame member are superposed with the central frame;

the rear portion of the central frame being pivotally mounted to the front portion of the central frame for swinging motion between the use position in which the rear portion extends generally upwardly from the front portion and lies generally in a plane oblique to a plane including the front portion and the stowed position in which the rear portion is substantially coplanar with the front portion.

9. A collapsible stroller as set forth in claim 8 wherein the central frame has peripheral edges, and wherein the forward frame member and the rearward frame member are constructed and arranged relative to the central frame such that in the stowed position the forward frame member and the central frame are disposed substantially within the peripheral edges of the central frame.

10. A collapsible stroller as set forth in claim 9 wherein the forward frame member is connected to the front portion of the central frame for swinging rearwardly and downwardly from its use position to its stowed position under the central frame and the rearward frame member is connected to the rear portion of the central frame for swinging forwardly and downwardly from its use position to its stowed position over the central frame.

11. A collapsible stroller as set forth in claim 10 wherein the front wheel projects above and below the central-frame when the forward frame member is in the stowed position.

12. A collapsible stroller as set forth in claim 11 the front wheel in the stowed position lies generally between a first plane parallel to the central fame member and tangentially intersecting the rear wheels on one side of the central frame and a second plane parallel to the central frame and tangentially intersecting the rear wheels on the opposite side of the central frame.

13. A collapsible stroller as set forth in claim 12 further comprising a seat removably mounted on the stroller.

14. A collapsible stroller as set forth in claim 13 wherein the seat is made of flexible sheet material adapted to collapse with the stroller frame members into the stowed position.

15. A collapsible stroller as set forth in claim 11 further comprising a strut adapted to releasably connect the rear portion of the central frame to the forward frame member in the use position thereby to hold the rear portion and forward frame member in a generally fixed relation relative to one another.

16. A collapsible stroller as set forth in claim 15 wherein the rearward frame member is hingedly attached to the rear portion of the central frame for swinging between the use position in which the rearward frame member extends generally rearwardly of the rear portion of the central frame and the stowed position in which the rearward frame member is folded over generally flat onto the rear portion of the central frame, and wherein the stroller further comprises means for releasably locking the rearward frame member in the use position.

* * * * *